US011538081B2

(12) United States Patent
Archibald et al.

(10) Patent No.: US 11,538,081 B2
(45) Date of Patent: Dec. 27, 2022

(54) METHOD FOR ARBITRATING ENCRYPTED ELECTRONIC TRANSACTIONS AMONG INTERMEDIARY AND AUTHORING USERS ONLY WHEN AN INTERACTION OCCURS BETWEEN AUTHORING AND CANDIDATE USERS WHO WAS EXPOSED BY THE INTERMEDIARY USER TO DATA PUBLISHED BY AUTHORING USER

(71) Applicant: Aliro Group LLC, Villanova, PA (US)

(72) Inventors: Robert William Archibald, Norwood, NJ (US); Frederick Harold Reffsin, Villanova, PA (US); Brian Ross Lurie, Bryn Mawr, PA (US)

(73) Assignee: Aliro Group LLC, Bryn Mawr, PA (US)

(*) Notice: Subject to any disclaimer, the term of this patent is extended or adjusted under 35 U.S.C. 154(b) by 77 days.

(21) Appl. No.: 16/821,505

(22) Filed: Mar. 17, 2020

(65) Prior Publication Data

US 2020/0320601 A1    Oct. 8, 2020

Related U.S. Application Data

(63) Continuation of application No. 16/362,096, filed on Mar. 22, 2019, now Pat. No. 10,628,866, which is a
(Continued)

(51) Int. Cl.
*G06Q 30/00* (2012.01)
*G06Q 30/06* (2012.01)
*H04L 9/40* (2022.01)

(52) U.S. Cl.
CPC ..... *G06Q 30/0619* (2013.01); *H04L 63/0281* (2013.01); *H04L 2463/102* (2013.01)

(58) Field of Classification Search
CPC ............ G06Q 30/0619; H04L 63/0281; H04L 246/102
(Continued)

(56) References Cited

U.S. PATENT DOCUMENTS 5,664,115 A    9/1997 Fraser
7,016,866 B1    3/2006 Chin
(Continued)

OTHER PUBLICATIONS

Anonymous, Magic Cap Used In New Handheld Communicators, Newsbytes, Jan. 6, 1994 (Year: 1994).*
(Continued)

*Primary Examiner* — Jeffrey A. Smith
*Assistant Examiner* — Brittany E Bargeon
(74) *Attorney, Agent, or Firm* — Nixon Peabody LLP

(57) ABSTRACT

System and computer-implemented method of permitting or arbitrating encrypted electronic transactions to occur among an intermediary and an author in an electronic data system only when an interaction occurs between the author and a candidate who was exposed by the intermediary to data published by the author. The author publishes criteria about a candidate, and the candidate posts information about the candidate, which is ingested and married to personally identifiable information about the candidate. A score is calculated indicating a correlation between the candidate and the published criteria, and an intermediary exposes the candidate to the criteria, which is tracked. When the candidate completes an interaction with the author, an encrypted transaction is permitted to occur between the author and the candidate through a proxy, without the author knowing the identity of the intermediary who facilitated the introduction.

1 Claim, 5 Drawing Sheets

Related U.S. Application Data continuation of application No. 15/184,773, filed on Jun. 16, 2016, now Pat. No. 10,282,768.

(58) Field of Classification Search
USPC .................................................. 705/26.44
See application file for complete search history.

(56) References Cited

U.S. PATENT DOCUMENTS

| | | | |
|---|---|---|---|
| 7,299,206 | B2 | 11/2007 | Taylor |
| 10,282,768 | B2 * | 5/2019 | Archibald .......... G06Q 30/0619 |
| 2002/0013760 | A1 * | 1/2002 | Arora ..................... G06Q 40/04 |
| | | | 705/37 |
| 2008/0235125 | A1 | 9/2008 | Danzan |
| 2010/0114739 | A1 * | 5/2010 | Johnston ................ G06Q 30/06 |
| | | | 705/26.1 |
| 2011/0137818 | A1 | 6/2011 | Goad |
| 2014/0164089 | A1 * | 6/2014 | Joa ..................... G06Q 30/0226 |
| | | | 705/14.27 |
| 2014/0289867 | A1 * | 9/2014 | Bukai ..................... G06F 21/44 |
| | | | 726/28 |
| 2015/0170148 | A1 | 6/2015 | Priebatsch |
| 2016/0140519 | A1 | 5/2016 | Trepca |
| 2016/0267144 | A1 | 9/2016 | Manimaran |

OTHER PUBLICATIONS

Anonymous, "Magic Cap Used in New Handheld Communications"; Newsbytes, Jan. 6, 1994 (Year: 1994) (5 pages).

\* cited by examiner

| | A | B | C | D | E | F | G | H | I | J | K | L |
|---|---|---|---|---|---|---|---|---|---|---|---|---|
| 1 | | | Candidate 1 Average Match | | Candidate 2 Perfect Relevancy Match (no location) | | Candidate 3 Low Relevancy/ Highly qualified | | Candidate 4 No Relevancy: Required Criteria B | | Candidate 5 Same as 4 - self applicant | |
| | Max points | Criteria | | | | | | | | | | |
| 2 | 225 | Required Criteria A | 0.5 | 112.5 | 1 | 225 | 0.1 | 22.5 | 1 | 225 | 1 | 225 |
| 3 | 225 | Required Criteria B | 0.7 | 157.5 | 1 | 225 | 0.23 | 51.75 | 0 | 0 | 0 | 0 |
| 4 | 100 | Required Criteria C | 0.6 | 60 | 1 | 100 | 0.26 | 26 | 0 | 0 | 0 | 0 |
| 5 | 100 | Mandatory Criteria A | Yes | 100 | No | -50 | Yes | 100 | Yes | 100 | Yes | 100 |
| 6 | 40 | Intermediary Score | 225 | 22.5 | 167 | 16.7 | 378 | 37.8 | 275 | 27.5 | 0 | 0 |
| 7 | 40 | Intermediary + Candidate Match Criteria D | Yes | 40 | No | 0 | Yes | 40 | No | 0 | No | 0 |
| 8 | 150 | Intermediary + Candidate Match Criteria E | No | 0 | Yes | 150 | Yes | 150 | Yes | 150 | No | 0 |
| 9 | 25 | Required Criteria F | 0.7 | 17.5 | 0.9 | 22.5 | 1 | 25 | 0.7 | 17.5 | 0.7 | 17.5 |
| 10 | 25 | Required Criteria G | 0.6 | 15 | 0.9 | 22.5 | 1 | 25 | 0.6 | 15 | 0.6 | 15 |
| 11 | 25 | Required Criteria H | 0.7 | 17.5 | 0.8 | 20 | 1 | 25 | 0.7 | 17.5 | 0.7 | 17.5 |
| 12 | 25 | Required Criteria J | 0.6 | 15 | 0.7 | 17.5 | 0.9 | 22.5 | 0.6 | 15 | 0.6 | 15 |
| 13 | 25 | Required Criteria K | 0.7 | 17.5 | 0.7 | 17.5 | 0.8 | 20 | 0.7 | 17.5 | 0.7 | 17.5 |
| 14 | 10 | Desired Criteria A | 0.8 | 8 | 0.6 | 6 | 0.9 | 9 | 0.8 | 8 | 0.8 | 8 |
| 15 | 10 | Desired Criteria B | 0.5 | 5 | 0.7 | 7 | 1 | 10 | 0.5 | 5 | 0.5 | 5 |
| 16 | 10 | Desired Criteria C | 0.6 | 6 | 0.8 | 8 | 0.9 | 9 | 0.6 | 6 | 0.6 | 6 |
| 17 | 10 | Desired Criteria D | 0.6 | 6 | 0.8 | 8 | 0.8 | 8 | 0.6 | 6 | 0.6 | 6 |
| 18 | 10 | Desired Criteria E | 0.7 | 7 | 0.9 | 9 | 0.8 | 8 | 0.7 | 7 | 0.7 | 7 |
| 19 | 1055 | | | 607 | | 804.7 | | 589.55 | | 617 | | 439.5 |

FIG. 3

|   | A | B | C | D | E | F | G | H | I |
|---|---|---|---|---|---|---|---|---|---|
| 1 | Max points | 100 | 100 | 100 | 50 | | 50 | | 400 |
| 2 | Criteria | Number of Candidates | Number Held | Number Engaged | % Held | Value | % Engaged | | Intermediary Score |
| 3 | Intermediary 1 | 1 | 1 | 1 | 100% | 50 | 100% | 50 | 103 |
| 4 | Intermediary 2 | 3 | 1 | 0 | 33% | 25 | 0% | 0 | 29 |
| 5 | Intermediary 3 | 20 | 3 | 1 | 15% | 0 | 5% | 0 | 24 |
| 6 | Intermediary 4 | 70 | 30 | 10 | 43% | 25 | 14% | 25 | 160 |
| 7 | Intermediary 5 | 20 | 2 | 0 | 10% | 0 | 0% | 0 | 22 |
| 8 | Intermediary 6 | 100 | 35 | 10 | 35% | 25 | 10% | 10 | 180 |
| 9 | Intermediary 7 | 500 | 100 | 25 | 20% | 0 | 5% | 0 | 225 |
| 10 | Intermediary 8 | 500 | 50 | 5 | 10% | -25 | 1% | 0 | 130 |
| 11 | Intermediary 9 | 100 | 100 | 100 | 100% | 50 | 100% | 50 | 400 |
| 12 | Intermediary 10 | 500 | 0 | 0 | 0% | -50 | 0% | 0 | 50 |
| 13 | Intermediary 11 | 500 | 250 | 100 | 50% | 50 | 20% | 25 | 375 |
| 14 | Intermediary 12 | 500 | 35 | 5 | 7% | -25 | 1% | 0 | 115 |
| 15 | Self Candidate | 1 | 0 | 0 | 0% | 0 | 0% | 0 | 1 |

METHOD FOR ARBITRATING ENCRYPTED ELECTRONIC TRANSACTIONS AMONG INTERMEDIARY AND AUTHORING USERS ONLY WHEN AN INTERACTION OCCURS BETWEEN AUTHORING AND CANDIDATE USERS WHO WAS EXPOSED BY THE INTERMEDIARY USER TO DATA PUBLISHED BY AUTHORING USER

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE PRESENT DISCLOSURE

Aspects of the present disclosure relate generally to systems and methods of permitting or arbitrating encrypted electronic transactions to occur among an intermediary user and an authoring user in an electronic data system only when an interaction occurs between the authoring user and a candidate user who was exposed by the intermediary user to data published by the authoring user.

BACKGROUND

Authoring users can publish information online, which is typically passively available on a website. Users to be exposed to this information must visit the website to locate the information, so authoring users must try to stand out among the millions of online content publishers to compete for the right set of eyeballs to access their published information. While this information can also be posted on one or more social media networking websites to reach a specific online community, this approach has limits on how targeted the information can be aimed at specific users. Authoring users may wish to target a specific user or users who satisfy certain criteria, but locating and identifying these users among the millions of online users is challenging. What is needed is a way to harness these millions of users as facilitators or proxies for the authoring users to connect authoring users' published information with the specific user(s) that the authoring user is targeting. In this way, computer network communications can be made more efficient, because network bandwidth is consumed far more efficiently when information published by authoring users finds its way to the target end users in the most direct route possible without having to download the information (and thereby consume network bandwidth resources) to thousands of users who are not actual target end users, but simply wasteful consumers of the data. Thus, there is a need to improve the efficiency of computer networks by reducing bandwidth consumption and needless downloading of data that is simply stored but then discarded or overwritten. In particular, for example, there is a need for reducing reliance on usage of online search engines, for example, to expose data published by an authoring user to a target user. Online search engines are currently responsible for at least a third of all Internet traffic, which means that a significant amount of the overall Internet bandwidth is consumed simply from servicing online search requests, and this bandwidth consumption continues to increase as the Internet expands, making relevant information harder to locate for users.

SUMMARY

Aspects of the present disclosure tracks which intermediary user exposed a candidate user to data created and published online by an authoring user, and when a specific interaction occurs between the authoring user and the candidate user involving the created data, an encrypted electronic interaction among the intermediary user and the authoring user is permitted to occur directly or using a host computer or computer system as a proxy for the encrypted electronic transaction without the authoring user having any knowledge as to the identity of the intermediary user who exposed the candidate user to the data published by the authoring user. The host computer or computer system can act as a proxy for the encrypted transaction or arbiter of whether the encrypted transaction occurs, permitting encrypted data to flow from the authoring user through the host computer as a proxy to the intermediary user without any identifying information about the intermediary user being transmitted or otherwise made available to the authoring user. Likewise, an encrypted electronic transaction can also occur among the authoring user and the candidate user using the host computer as a proxy for that encrypted electronic transaction.

A technical problem posed the present disclosure is that when an authoring user creates data and publishes it, and when a candidate user accesses the published data, the authoring user does not know how the candidate user was initially exposed to the created data. The present disclosure tracks which "intermediary" user exposed the created data to which candidate user(s). When the candidate user was exposed to the created data by an intermediary user, this association is tracked by the present disclosure, allowing an encrypted electronic transaction to occur among the intermediary user and the authoring user directly or using a host computer or computer system as a proxy for the electronic transaction, only when a certain or specific interaction occurs between the candidate user and the authoring user involving the published data. For example, once the authoring user is satisfied that the candidate user satisfies criteria set forth in the published data, the authoring user can inform the host computer to initiate the encrypted electronic transaction among the authoring user and the anonymous (vis-à-vis the authoring user) intermediary user who exposed the published data to the candidate user. In effect, the intermediary users operate as brokers or facilitators to locate candidate users as "surrogate" searching entities on behalf of the authoring user, to introduce candidate users to data published by the authoring user, and thereby connect the authoring user to the most relevant potential candidate users who satisfy criteria set forth in the published data. This approach dramatically reduces computer network resources and bandwidth consumption by connecting authoring users with the most relevant target users in the most direct manner. Instead of relying, for example, on target users to find the published data via search engines, intermediary users serve as proxies operating on behalf of the authoring user to identify most relevant candidate users who satisfy criteria set forth in the published data.

The present disclosure creates a more secure computer network in that the authoring user can be confident in engaging in an encrypted interaction with the intermediary user directly or through a proxy only when the proxy confirms that the intermediary user which exposed the published data to the candidate user, and only when the authoring user confirms to the proxy that the candidate user satisfies criteria set forth in the authoring user's published data. The authoring user does not need any knowledge or awareness of the intermediary user, which makes computer network traffic even more efficient because the proxy assumes the offline burden of tracking which intermediary user exposed the candidate user to the authoring user's published data, thereby freeing the network bandwidth that would have otherwise been consumed by this effort to be used for other purposes.

This enhanced confidence also improves the security of electronic communications, in that the authoring user engages in an encrypted transaction directly or through a proxy with an unknown intermediary user. This intermediary user is known to the proxy, but not to the authoring user. The proxy ensures that the encrypted transaction occurs between the correct set of users, enhancing the confidence of the authoring users to consider candidate users, and enhancing the confidence of the intermediary users to act as surrogate searching entities on behalf of the authoring users to locate candidate users who satisfy criteria set forth in the data published by the authoring users. There are at least two ways the proxy improves communication security across the computer network. First, the proxy tracks which intermediary user exposed a candidate user to data published by a specific authoring user. Second, the authoring user confirms for itself in a specific interaction with the candidate user that the candidate user satisfies criteria set forth in the published data and notifies the proxy accordingly, which triggers the proxy to broker the electronic transaction among the intermediary user and the authoring user who does not know the identity of the intermediary user.

According to an aspect of the present disclosure, a method is disclosed of arbitrating encrypted electronic transactions among an intermediary user and an authoring user of an electronic data system only when an interaction occurs between the authoring user and a candidate user who was exposed by the intermediary user to data published by the authoring user. The method can include receiving at a computer server system published electronic data records over a computer network created and published by authoring users. Some or all of the published electronic data records include a set of required criteria and a set of desired criteria both established by corresponding authoring users. The method includes receiving, over the computer network or another network, candidate electronic data records ingested from an electronic web crawler component and including personally identifiable information posted by third parties. The method automatically calculates, for each of the candidate users by the computer server system, a relevancy score indicative of a correlation between (a) at least some of the information extracted from the respective candidate electronic data record posted by the respective candidate user and (b) weighted ones of the corresponding sets of required and desired criteria. The method tracks by the computer server system a first of the intermediary users that exposed a first of the candidate users to information associated with the first electronic data by storing an association in an electronic memory device between the first intermediary user and the first candidate user. The method receives, at the computer system, an indication from a first of the authoring users of an occurrence of an interaction between the first authoring user and the first candidate user who was exposed by the first intermediary user to the information associated with the first electronic data. The method includes, responsive to receiving the indication of the occurrence of the interaction between the first authoring user and the first candidate user, permitting an encrypted electronic transaction to occur among the first authoring user and the first intermediary user directly or using the computer system as a proxy for the encrypted electronic transaction.

The method can further include, responsive to receiving the indication of the interaction between the first authoring user and the first candidate user, permitting another encrypted electronic transaction to occur among the first authoring user and the first candidate user using the computer system as a proxy for the encrypted electronic transaction. The method can further include, responsive to receiving the indication of the interaction between the first authoring user and the first candidate user, the computer system and the first authoring user completing an encrypted electronic transaction directly between one another.

The indication of the interaction can include an indication from the authoring user that the candidate user satisfies at least some of the criteria set forth in the required criteria or the desired criteria or both. The method can further include receiving, at the computer system, a modification to the set of the required criteria and the set of the desired criteria from the first authoring user, and automatically recalculating, for each of the candidate users by the computer server system, a new relevancy score indicative of a correlation between (a) at least some of the information extracted from the respective candidate electronic data record posted by the respective candidate and (b) weighted ones of the modified sets of required and desired criteria.

Each of the required criterion in the set of required criteria can have a higher assigned weight than corresponding ones of each of the desired criterion in the set of desired criteria, such that a higher relevancy score indicates a higher correlation between the set of required criteria and the information extracted from the respective candidate electronic data record.

The respective weights assigned to at least some of the required criteria in the set of required criteria can be determined by and received from the first authoring user. The automatically calculating the relevancy score can include receiving from an electronic entity recognition component a numeric value indicating an extent of a relevancy match between (a) the information extracted from the respective candidate electronic data record and (b) a corresponding one of the set of required criteria or the set of desired criteria.

The method can further include automatically calculating, for each of the set of required criteria and the set of desired criteria, a sub-score based on the corresponding relevancy match and a corresponding weighted value assigned by the first authoring user for the corresponding criteria. At least some of the published electronic data records can further include a set of mandatory criteria. The set of mandatory criteria can include a geographic location.

The automatically calculating the relevancy score can include determining whether a geographic location extracted from the information associated with the respective candidate electronic data record is within the geographic location in the set of mandatory criteria, and if so, assigning a maximum sub-score to the geographic location criterion of the set of mandatory criteria, but if not, assigning a minimum sub-score to the geographic location criterion of the set of mandatory criteria, without applying any weighting to the geographic location criterion of the set of mandatory criteria. The interaction between the first authoring user and the first candidate user can involve the information associated with the first electronic data at the geographic location set forth in the set of mandatory criteria.

The tracking can include tagging the first intermediary user and the first candidate user and storing an association between the first intermediary user and the first candidate user in the electronic memory device. The interaction between the first authoring user and the first candidate user can involve the information associated with the first electronic data. The interaction between the first authoring user and the first candidate user can be an interaction in the physical world between an authoring person corresponding to the first authoring user and a candidate person corresponding to the candidate user.

According to another aspect of the present disclosure, a computer system is disclosed for arbitrating encrypted electronic transactions among an intermediary user and an authoring user of an electronic data system only when an interaction occurs between the authoring user and a candidate user who was exposed by the intermediary user to data published by the authoring user. The system includes one or more communication interfaces, a score calculation component, an intermediary tracking component, and a proxy transaction component.

The communication interface(s) are configured to receive, over one or more computer networks, (a) published electronic data records created and published by authoring users and (b) candidate electronic data records ingested from an electronic web crawler component and including personally identifiable information posted by third parties. Some or all of the published electronic data records include a set of required criteria and a set of desired criteria both established by corresponding authoring users.

The score calculation component is configured to automatically calculate, for each of the candidate users by the computer server system, a relevancy score indicative of a correlation between (a) at least some of the information extracted from the respective candidate electronic data record posted by the respective candidate user and (b) weighted ones of the corresponding sets of required and desired criteria.

The intermediary tracking component is configured to: track a first of the intermediary users that exposed a first of the candidate users to information associated with the first electronic data by storing an association in an electronic memory device between the first intermediary user and the first candidate user, and receive an indication from a first of the authoring users of an occurrence of an interaction between the first authoring user and the first candidate user who was exposed by the first intermediary user to the information associated with the first electronic data.

The proxy transaction component is configured to, responsive to receiving the indication of the occurrence of the interaction between the first authoring user and the first candidate user, permit an encrypted electronic transaction to occur among the first authoring user and the first intermediary user using the proxy transaction component as a proxy for the encrypted electronic transaction.

The communication interface(s), the score calculation component, the intermediary tracking component, and the proxy transaction component can be incorporated in a computer server.

The proxy transaction component can be further configured to, responsive to receiving the indication of the interaction between the first authoring user and the first candidate user, permit another encrypted electronic transaction to occur among the first authoring user and the first candidate user directly or using the proxy transaction component as a proxy for the encrypted electronic transaction.

The one or more communication interfaces can be further configured to receive a modification to the set of the required criteria and the set of the desired criteria from the first authoring user. The score calculation component can be further configured to automatically recalculate, for each of the candidate users by the computer server system, a new relevancy score indicative of a correlation between (a) at least some of the information extracted from the respective candidate electronic data record posted by the respective candidate and (b) weighted ones of the modified sets of required and desired criteria.

The computer system can further include an electronic entity recognition component configured to (a) determine a numeric value indicating an extent of a relevancy match between (a) the information extracted from the respective candidate electronic data record and (b) a corresponding one of the set of required criteria or the set of desired criteria, and (b) communicate the numeric value to the score calculation component for calculating the relevancy score.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 3 is a table of an example scoring rubric of exemplar candidate users and their scores as calculated by the score calculation component shown in FIG. 1.

FIG. 4 is a table of an example scoring rubric of exemplar intermediary users and their scores as calculated by the score calculation component shown in FIG. 1.

DETAILED DESCRIPTION

Figure 1:
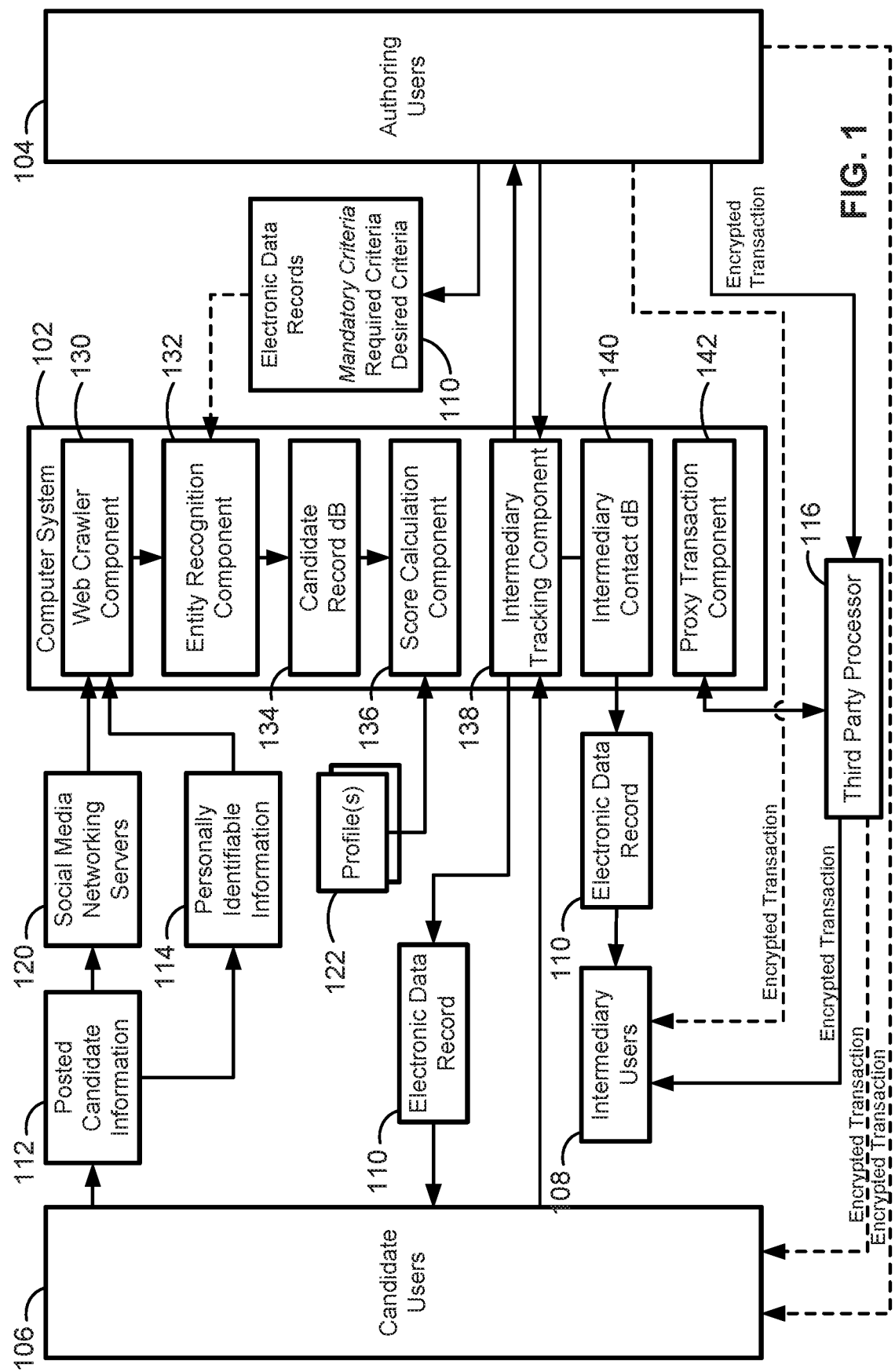
FIG. 1 is a functional block diagram of a system according to an aspect of the present disclosure.

While this disclosure is susceptible of embodiment in many different forms, there is shown in the drawings and will herein be described in detail example implementations of the inventions and concepts herein with the understanding that the present disclosure is to be considered as an exemplification of the principles of the inventions and concepts and is not intended to limit the broad aspect of the disclosed implementations to the examples illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 is a functional block diagram of a system 100, such as an electronic data system, according to an aspect of the present disclosure. First, the general components of the system 100 will be introduced, followed by examples. The system 100 includes a computer system 102, which can be connected to one or more computer networks, such as the Internet. A computer as used herein includes any one or more electronic devices having a central processing unit (CPU) or controller or microprocessor or microcontroller as understood by those skilled in the art of electronic computers. Examples of computers include tablet computers, laptop computers, desktop or personal computers, servers, smartphones, a wearable electronic device such as a watch, an eyeglass, an article of clothing, or a wristband, and personal digital assistants (PDAs). The term computer as used herein can include a system of electronic devices coupled together to form what is conventionally referred to as a computer. For example, one or more input devices, such as a keyboard or a mouse, and one or more electronic display devices, such as a video display, can be coupled to a housing that houses the CPU or controller. Or, all components of the computer can be integrated into a single housing, such as in the case of a tablet computer or a smartphone.

The computer system 102 can conventionally include or can be operatively coupled to one or more memory devices that store digital information therein, including non-transitory machine-readable instructions and data. The computer system 102 can include one or more electronic human-machine interface (HMI) devices, which corresponds to a human-machine interface that accepts inputs made by a human (e.g., via touch, click, gesture, or voice) and converts those inputs into corresponding electronic signals. Examples of HMI devices include a touchscreen, a stylus, a computer mouse, a gesture sensing device configured to sense a human-made gesture, a keyboard, a mouse, a camera, or a microphone. The computer system 102 also includes one or more software or firmware applications, and one more electronic video display devices configured to display information that can be visually or aurally perceived. Examples of display devices include a video display, a stereoscopic display, or any electronic display capable of visually portraying information including text, static graphics, and moving animations that is perceivable by the human eye. The video display devices display visual information contained in an electronic user interface (UI), which can be downloaded to the computer system 102 over a computer network from one or more external computer servers. The electronic user interface can also include selectable elements that are selectable using the one or more HMI devices. Thus, the electronic user interface generally can include a graphical user interface (GUI) component and a human-machine user interface component, via which a human user can select selectable elements displayed on the GUI via the HMI interface.

Figure 2:
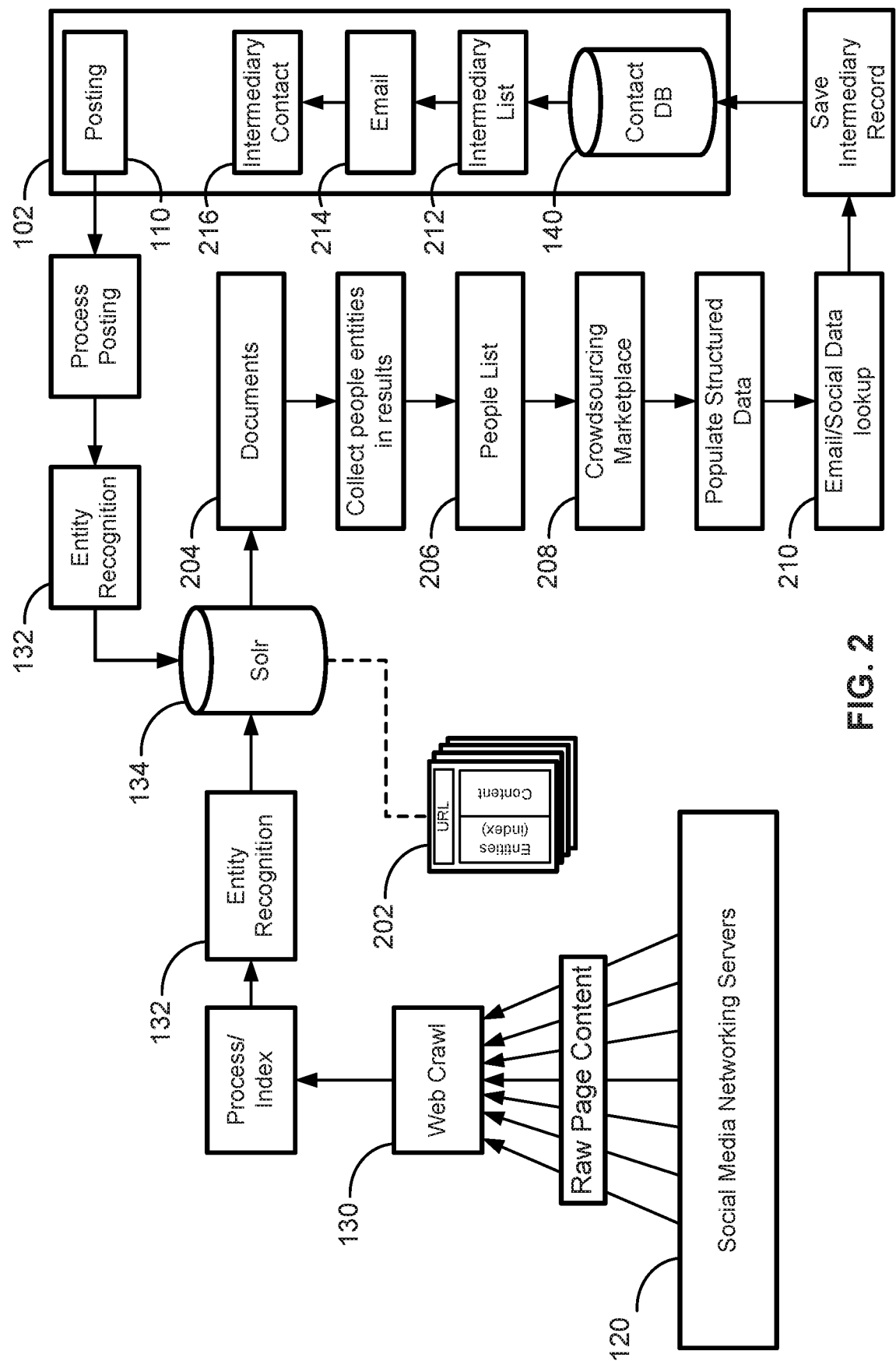
FIG. 2 is a functional block diagram of the system shown in FIG. 1 organized a different way.

A computer system 102 can include various electronic or digital modules or components, which can be standalone components that are coupled through a computer network to the computer system or represent an application program interface (API) as that term is understood in the computer and software programming arts. The modules and components shown in FIGS. 1 and 2 show an exemplary configuration, but those skilled in the art will appreciate that other configurations can be used to carry out the aspects of the present disclosure. The particular configurations of the modules and components are not pertinent to these aspects. Some or all of the components can be implemented in software, which can be configured to carry out programmed functions. The term "configured to" used in the context of a component implemented in software refers to programming the component with machine-readable instructions, such as object code as that term is understood in the computer programming art, to carry out the programmed functions.

A (software or firmware) module or component herein can refer to computer-readable object code that executes a software sub-routine or program, which corresponds to instructions executed by any microprocessor or microprocessing device to perform described functions, acts, or steps. Any of the methods or algorithms or functions described herein can include non-transitory machine or computer-readable instructions for execution by: (a) an electronic processor, (b) an electronic controller, and/or (c) any other suitable electronic processing device. Any algorithm, software module, software component, software program, routine, sub-routine, or software application, or method disclosed herein can be embodied as a computer program product having one or more non-transitory tangible medium or media, such as, for example, a flash memory, a CD-ROM, a floppy disk, a hard drive, a digital versatile disk (DVD), or other electronic memory devices, but persons of ordinary skill in the art will readily appreciate that the entire algorithm and/or parts thereof could alternatively be executed by a device other than an electronic controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.).

Connected to the computer system 102 in FIG. 1 are multiple authoring users 104, candidate users 106, and intermediary users 108. A "user" herein can refer interchangeably to a computer or computer terminal, or a human person operating a computer or computer terminal. It is convenient in the computer arts to refer to both entities as a user, and this nomenclature will be used throughout this disclosure. The authoring users 104 publish electronic data records 110 over a computer network, such as the Internet. The electronic data records 110 include a set of required criteria and a set of desired criteria about a candidate user of interest. The electronic data records 110 can optionally include a set of mandatory criteria about a candidate user of interest. The candidate users 106 post candidate information 112 to one or more social media networking servers 120. These servers conventionally host websites that offer social media networking platforms for online users to interact and share information about themselves. The candidate users 106 can also post in the candidate information 112 personally identifiable information 114 about themselves. This personally identifiable information 114 can also be posted to the one or more social media networking servers 120, or to another computer server accessible over the Internet.

The computer system 102, as discussed above, can include one or more computers or electronic components or modules as defined above. Functionally, these computers or components or modules are grouped together in FIG. 1 by reference number 102. The computer system 102 includes at least a web crawler component 130, an entity recognition component 132, a candidate record database 134, a score calculation component 136, an intermediary tracking component 138, an intermediary contact database 140, and a proxy transaction component 142, which is coupled over the computer network to a third party processor 116. The computer system 102 can include one or more wired and/or wireless communication interfaces (not shown) to communicate information between the computer system 102 and one or more systems or components external to the computer system 102 and operatively coupled thereto.

Having introduced some of the various components of the system 100, attention will now be drawn to an exemplar process flow according to an aspect of the present disclosure.

One or more authoring users 104 post over a computer network (which is not necessarily the same computer network through which posted candidate user content is ingested by the web crawler component 130), such as through an API, electronic data records having a set of required criteria and a set of desired criteria about a candidate user. The set of required criteria refers to criteria or characteristics or qualities about a candidate user that the authoring user requires to be present, whereas the set of desired criteria refers to criteria or characteristics or qualities about a candidate user the authoring user desires, but does not necessarily require, to be present. An authoring user 104 is a user who authors content and publishes the same in the form of an electronic data record to the computer system 102 or to one or more computer networks to which the computer system 102 is operatively connected.

To locate candidate users, aspects of the present disclosure harness a conventional web crawler component to scrape published data from multiple authoring users. The web crawler component provides the scraped data to an entity recognition engine or component that scores each entity among the scraped data. These scores are provided to a calculation engine or component that calculates weighted scores for each entity scores corresponding to a set of criteria established by the authoring user. The authoring user have two or three sets of criteria, including mandatory criteria, which is not weighted, required criteria, which is weighted relatively high, and desired criteria, which is weighted lower than weights assigned to required criteria. These criteria can be seen as dials, which the authoring user can set, to establish the criteria of a particular candidate user of interest. By adjusting these criteria dials, the weights are automatically and dynamically adjusted by the calculation engine. The mandatory criteria (which can be a criterion), if present, operate as binary switches in that the candidate user either satisfies or does not satisfy the mandatory criteria. If the candidate user does not satisfy one or more mandatory criteria, a minimum score is assigned to that criteria; otherwise if the candidate user satisfies the mandatory criteria, a maximum score is assigned to that criteria. An example of a mandatory criterion includes a physical geographic location where the candidate user must be present. The required versus desired criteria can also be established and modified by the authoring user. Required criteria can indicate criteria in or about or regarding or associated with a target candidate user that the authoring user requires to be present. Desired criteria indicates criteria in a target candidate user that the authoring user desires, but does not insist, on being present. The required and desired criteria are weighted, with required criteria generally being assigned a higher or greater weight compared to desired criteria. Each required criterion of the required criteria can have different weights, and likewise for each desired criterion of the desired criteria. A criteria or criterion refers to an attribute, characteristic, or trait about or regarding or associated with a candidate user of interest. As discussed above, the authoring users 104 would ordinarily require extensive use of computer search engines to locate candidate users satisfying one or more of the required or desired criteria. Each authoring user 104 can have the option of adjusting which criteria are required versus desired, and can optionally have the option to rank each criterion, which causes a commensurate adjustment in a weight assigned to each criterion, where lower ranked criterion is assigned to a smaller or lesser weight value. These adjustment options are referred to colloquially herein as dials, because they allow the authoring user 104 to adjust the weights associated with each criterion, and to determine which criteria are required and which are merely desired. Optionally, a mandatory criterion, such as geographic location, can also be present, which is not weighted but rather presents a binary switch that provides a maximum or a minimum impact on an overall score for the candidate user, as discussed further below. When presented as an option, the authoring user 104 can select which criterion is mandatory, which removes that selected criterion from being weighted.

The candidate users 106 post information about themselves as candidate information 112 to one or more social media networking servers 120. As discussed above, this information 112 can typically include personally identifiable information 114, which can also be retrieved from other types of computer servers that do not operate a social media networking platform. These users are referred to as candidates because they are would-be matches for the criteria set forth in the data records 110 published by the authoring users 104. In an online community of millions of users, locating candidate users who match criteria published by authoring users would otherwise consume significant network resources and bandwidth, where both finders (authoring users) and seekers (candidate users) would otherwise have to use conventional tools, such as search engines, to connect with one another. The present disclosure significant reduces consumption of these resources and bandwidth by identifying matches offline through the scoring and tracking algorithms discussed herein.

To do so, a conventional web crawler component 130 scrapes (as that term is understood in the art of electronic data mining) or ingests data from the social media networking servers 120. A list of seed universal resource locators (URLs) are provided to the web crawler, which URLs point to likely locations where the required or desired criteria can be obtained or where candidate users create trails of personally identifiable information 114. An example of a web crawler component 130 is the 80Legs custom web scraping and web crawling platform available as an API from Datafiniti, LLC, the details of which are incorporated herein by reference. The web crawler component 130 outputs a text file containing relevant content scraped from the seed URLs and provided to an entity recognition component 132, which extracts from the web crawler output (including the URL web page content) various entities corresponding to the criteria set forth in the data records 110. An example of an entity recognition component 132 includes the AlchemyAPI available from IBM Corporation, the details of which are incorporated herein by reference. The functionality of the web crawler component 130 and the entity recognition component 132 can be merged or integrated into a single electronic tool or set of electronic tools, such as the Entelo software-as-a-service (Saas) platform available from Entelo, Inc., the details of which are incorporated herein by reference. Each web page content, the associated URL for the web page, a list of associated entities excavated by the entity recognition component 132, the entity types, entity counts, and relevance score are stored as a document 202 (shown in FIG. 2) in a candidate record database 134. The score calculation component 136 calculates scores indicative of a correlation between entity information extracted by the entity recognition component 132 and the criteria set forth in the data records 110 published by the authoring users. Additional details of the score calculations are discussed below in connection with FIGS. 3 and 4. The score calculation component 136 outputs a score for candidate users who match one or more criteria in the data records published by the authoring users 104.

The intermediary tracking component 138 tracks which intermediary users 108 exposed which candidate users 106 to data records 110 published by authoring users 104. The intermediary contact database 140, 216 includes a database of contact information of intermediary users, including their email addresses 214 (FIG. 2). The intermediary tracking component 138 tags electronic data records 110 that the intermediary users 108 have exposed to the candidate users 106 by associating the specific data record 110 of a specific authoring user 104 to an intermediary user 108 and the candidate user 106 to which the intermediary user 108 exposed the data record. The data records 110 exposed by the intermediary user 108 can be representative of the original data records 110 published by the authoring user 104, such as setting forth the criteria in a summative form.

The third party processor 116 is used by the proxy transaction component 142 to broker an encrypted transaction between the authoring user 104 and the intermediary user 108 without any direct communication between the authoring and intermediary users 104, 108. Once an authoring user 104 confirms with the computer system 102 that an interaction between the authoring user 104 and the candidate user 106 who was exposed to a data record 110, which was published by the authoring user 104, by an intermediary user 108 has occurred, where the authoring user 104 confirms that the candidate user 106 satisfies one or more of the criteria set forth in the data record 110, the proxy transaction component 142 of the computer system 102 invokes the third party processor 116 to cause an encrypted transaction to occur via the computer system 102 as a proxy for the encrypted transaction between the authoring user 104 and the intermediary user 108 and optionally between the authoring user 104 and the candidate user 106 who as originally exposed to the data record 110 by the intermediary user 108. The interaction can be an interaction in the physical world between respective persons associated with the authoring user 104 and the candidate user 106.

FIG. 2 illustrates the process flow and functionality from a different perspective. The electronic data records 110 published by the authoring users 104 can be processed by the entity recognition component 132 and stored as documents (like those from the posted candidate information) in a database 134, such as the candidate record database 134. The Solr open source search platform server available from the Apache Software Foundation is an example of a suitable database or server platform for the database 134, which can be used to store both candidate records posted by candidate users 106 and data records published by the authoring users 104. The intermediary tracking component 138 can query the database 134 for the top matching people entities satisfying a query, and the people entities can be collected and populated into a list 206. The people entities correspond to names of candidate users 106 satisfying the query. These people entities 206 and associated URLs from the locations where these names were extracted are presented to a web interface to a crowdsourcing marketplace 208 along with a form to capture required fields. An example of the crowdsourcing marketplace is the Mechanical Turks web service available from Amazon, Inc., the details of which are incorporated herein by reference. The web service populates structured data in the form from the data retrieved from the database 134 and from queries to the Internet to populate the personally identifiable fields in the form, such as name and email address for each of the candidates. This structured data is passed to a personal information query tool 210 to extract contact information, social media data, and other personally identifiable information 114 about the candidate users, and this structured people data containing the personally identifiable information 114 is stored in the contact database 140 as an intermediary user record. The contact database 140 can be queried to produce a list of intermediary users 212, and the computer system 102 can automatically prepare an email 214 to each of the intermediary users 108 returned from the database 140 along with information about the data record 110 published by the authoring user 104. The computer system 102 can also prepare an email or other electronic message to send to a candidate user 106 or for the intermediary user 108 to send to the candidate user 106. When the data record 110 published by the authoring user 104 is communicated from the intermediary user 108 to the candidate user 106, the intermediary tracking component 138 associates those users 106, 108 with the specific data record 110 published by the authoring user 104 to track which intermediary user 108 exposed the data record 110 (or representative information in the data record 110) to which authoring user 104.

FIG. 3 is a table of an example scoring rubric of exemplar candidate users and their scores as calculated by the score calculation component shown in FIG. 1. Here, column A includes the maximum number of points assignable to each of the criteria listed in rows 2-18. Row 5 includes mandatory criteria set by an authoring user 104, whereas rows 2-4 and 9-13 include required criteria A-K. Rows 14-18 include desired criteria A-E. Fewer or more criteria can be present in an electronic data record 110, as this table in FIG. 3 presents just one exemplar of many conceivable possibilities. Five exemplar candidates are shown along with sub-scores for each criterion. For example, in cell C2, the first candidate user 106 has been assigned a score by the entity recognition component 132 of 0.5, indicating an average correlation between the required criteria A set forth in the data record published by the authoring user 104 and the information 112 scraped about the candidate user 106 from the social media networking servers 120 by the web crawler component 130. This required criteria A is weighted relatively heavily, so the sub-score for this criterion is calculated by the score calculation component 136 to be 112.5. Note that in row 5, the mandatory criteria A is indicated to be a binary match. If a match is found, a maximum sub-score of 100 is assigned; if a match is not found, a minimum sub-score of −50 is assigned to the first candidate user 106. Referring again to the first candidate user 106, a fairly strong correlation can be seen between required criteria B, F, H, and K. These higher-weighted criteria drive up the first candidate user's overall score of 607, shown in cell D19. The second candidate user has a perfect match with the first three required criteria A-C, but is not a match for the mandatory criteria A, which affects the score of 694.7, but this second candidate user 106 will be determined by the computer system 102 to have the best correlation with the criteria published by the authoring user 104 even though the authoring user's mandatory criteria is not present in this particular second candidate user 106.

As can be seen, because desired criteria are weighted less, even strong correlations among, for example, the third candidate user in cells G16-18 do not have a significant impact on the overall score of 479.55. Another criteria that the score calculation component 136 can take into account involves the intermediary user 108 who exposed the candidate user 106 to the data record 110 published by the authoring user 104. Row 6 is an intermediary score, which is described in more detail in connection with FIG. 4 below. This intermediary score reflects a "clout" score regarding a particular intermediary user, such that an intermediary user who exposes more candidate users 104 to data records 110 published by authoring users 104, the higher the score assigned to that intermediary user 108. The row 6 sub-score is a metric that takes into account the intermediary user's ability or potential to make meaningful connections between authoring users and candidate users. The row 7 sub-score indicates a match between the intermediary user 108 and the candidate user 106 regarding a mandatory criteria D. If both the intermediary and candidate users 108, 106 both share the same criteria D, a maximum sub-score is assigned; otherwise no points is assigned. Another mandatory criteria E is shown in row 8. The authoring user 104 has chosen to weight these criteria in rows 6-8 relatively low compared to the criteria in rows 2-3. A fifth candidate user 106 is another case contemplated by the present disclosure. It is contemplated that the intermediary user 108 and the candidate user 106 can be one and the same. In this example shown in FIG. 3, however, the fifth user 106, 108 is not as good a match among the criteria published in a data record by an authoring user 104 compared to the other four candidate users.

FIG. 4 is a table of an example scoring rubric of exemplar intermediary users and their scores as calculated by the score calculation component shown in FIG. 1. The scores from FIG. 4 are populated in row 6 of the table shown in FIG. 3. Here, twelve intermediary users are shown with their respective intermediary scores as calculated by the score calculation component 136. The ninth intermediary user is assigned the maximum number of 400 points as the intermediary score. The criteria to calculate the intermediary score can be weighted. Thus, in column B, the number of candidates that the intermediary user 108 has successfully introduced to an authoring user 104 is assigned a weight of 100 or 25% of the maximum score. All of those candidates as shown in cell D11 were engaged by the authoring user 104, and thus, the ninth intermediary user receives a total sub-score of 100 in D11. Cell E11 refers to the percentage of candidates that the authoring user is considering engaging but has not yet engaged. Because these engagements still count as introductions, they are assigned a weight of 50.

Column H refers to a calculated value that is computed to produce the intermediary score. An example calculation of the column H values is:

=IF($G11$<0.06,0,IF($G11$>0.49,50,IF(AND($G11$>0.05, $G11$<0.11),10,IF(AND($G11$>0.1,$G11$<0.26),25, IF(AND($G11$>0.25,$G11$<0.5),40, "BAD")))))

The intermediary score for row 11 can be calculated according to the formula:

=SUM(IF($B11$<$B\$1$,$B11$,$B\$1$),IF($C11$<$C\$1$,$C11$,$C\$1$), IF($D11$<$D\$1$,$D11$,$D\$1$),$F11$,$H11$)

In other words, if an intermediary user's percentage of engagements falls below a threshold, that intermediary user's score can be penalized by subtracting value, such as shown in cells F10, F12, and F14, whose corresponding intermediary users have less than a 5% success rate of historical engagements between an authoring user and a candidate user. Finally, in row 15, to account for a scenario where the candidate and intermediary user are one and the same, a value of 1 is assigned as the intermediary score.

Figure 5:
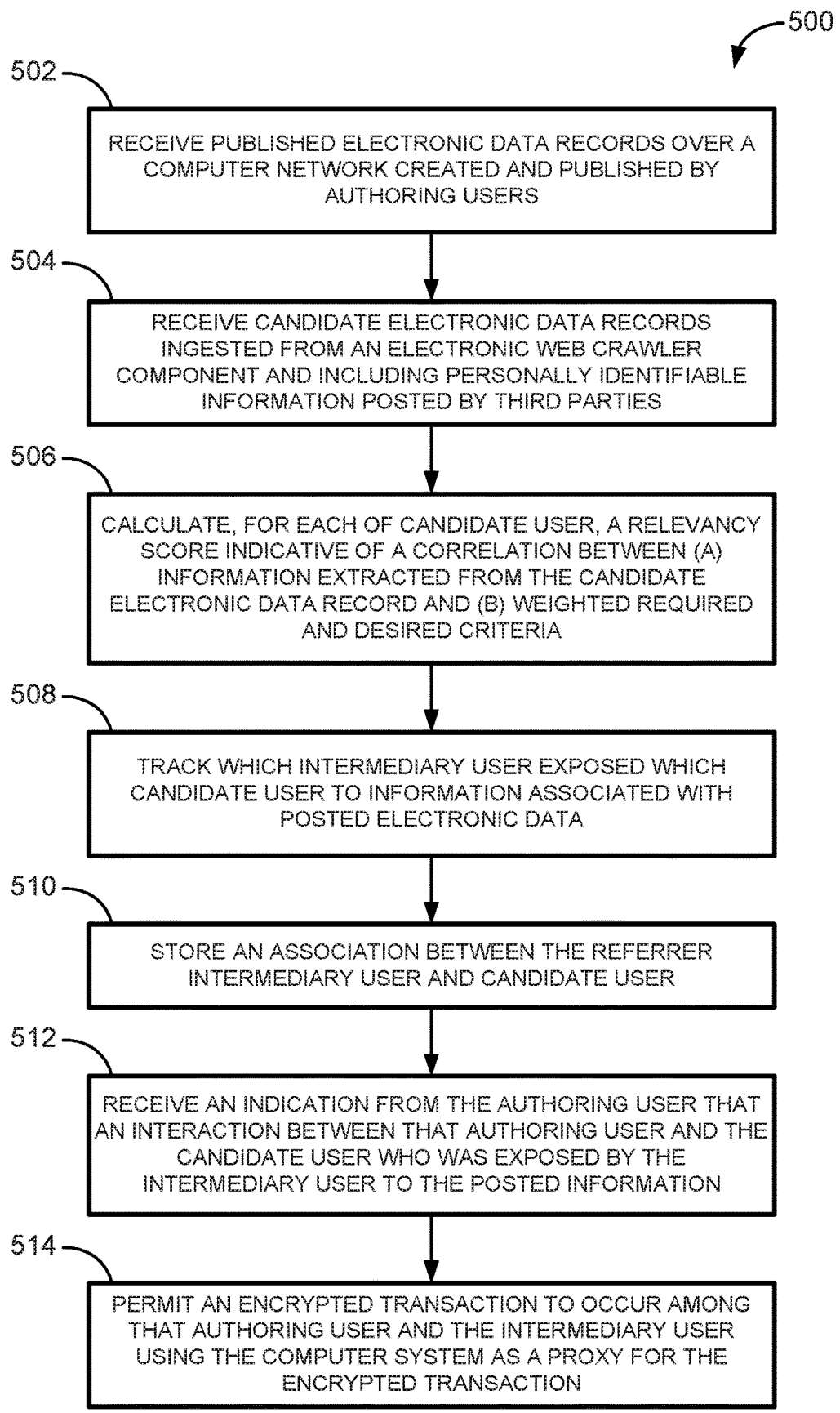
FIG. 5 is an example flowchart of a process or method of permitting or arbitrating encrypted electronic transactions to occur among an intermediary user and an authoring user in an electronic data system only when an interaction occurs between the authoring user and a candidate user who was exposed by the intermediary user to data published by the authoring user.

FIG. 5 is an example flowchart of an algorithm 100 of permitting or arbitrating encrypted electronic transactions to occur among an intermediary user and an authoring user in an electronic data system only when an interaction occurs between the authoring user and a candidate user who was exposed by the intermediary user to data published by the authoring user. A computer server system 100 receives published electronic data records 110 over a computer network created and published by authoring users 104 (502). The published electronic data records include a set of required criteria and a set of desired criteria both established by each of the authoring users. Candidate electronic data records are received, over the computer network, as ingested from an electronic web crawler component and including personally identifiable information posted by third parties, which may be the candidate users themselves (504). For each of the candidate users, the computer server system 102 automatically calculates a relevancy score indicative of a correlation between (a) at least some of the information extracted from the respective candidate electronic data record posted by the respective candidate user and (b) weighted ones of the corresponding sets of required and desired criteria (506). The computer system 102 tracks a first of the intermediary users 108 that exposed a first of the candidate users 106 to information associated with the first electronic data 110 (508) by storing an association in an electronic memory device, such as the database 134, between the first intermediary user 108 and the first candidate user 106 (510). The computer system 102 receives an indication from a first of the authoring users 104 of an occurrence of an interaction between the first authoring user 104 and the first candidate user 106 who was exposed by the first intermediary user 108 to the information associated with the first electronic data 110 (512). Then, the computer system 102 permits an encrypted electronic transaction to occur among the first authoring user 104 and the first intermediary user 108 using the computer system 102 as a proxy for the encrypted electronic transaction (514).

While this disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A computer-implemented method of arbitrating encrypted electronic transactions among an intermediary user and an authoring user of an electronic data system only when an interaction occurs between the authoring user and a candidate user, the method comprising the steps of:

analyzing at a computer server system a plurality of published electronic data records over a computer network created and published by a plurality of authoring users, at least some of the published electronic data records including a set of first criteria;

automatically assigning weights, by a calculation engine of the computer server system, to a set of first weighted criteria but not to a set of unweighted mandatory criteria, such that a higher candidate score indicates a higher correlation between the set of first weighted criteria and information extracted from respective candidate electronic data record;

receiving, over the computer network or another network, a plurality of candidate electronic data records from one or more data sources, the plurality of candidate electronic data records including personally identifiable information of a plurality of candidate users stored online by third parties;

storing a plurality of intermediary users in an intermediary contact database;

determining, by an intermediary tracking component, that an electronic communication was exchanged between a first of the intermediary users and a first of the candidate users, the electronic communication including information associated with a first of the published electronic data records, to expose the first of the candidate users to information associated with the first of the published electronic data records, wherein the first of the intermediary users operates on behalf of the first of the authoring users and introduces the first of the candidate users to the first of the published electronic data records via the electronic communication;

responsive to the determining that the first of the intermediary users exposed the first of the candidate users to the information associated with the first of the published electronic data records, the intermediary tracking component storing in an electronic memory device an association of the first of the published electronic data records with the first of the intermediary users and the first of the candidate users;

automatically calculating by a score calculation component, for the first of the intermediary users, an intermediary score based on at least one weighted criterion that is indicative of a number of engagements previously made by the first of the intermediary users between authoring users of the plurality of authoring users and candidate users of the plurality of candidate users;

automatically calculating by the computer system, for each of at least some of the candidate users, a candidate score that is based on the intermediary score for the first of the intermediary users and further based on correlations between (a) at least some of the personally identifiable information extracted from the respective one or more of the plurality of candidate electronic data records retrieved online and associated with the respective one of the candidate users and (b) at least some of the weights assigned to the set of the first weighted criteria;

tracking, using the stored association, by the computer server system that the first of the intermediary users exposed the first of the candidate users to information in the first of the published electronic data records, thereby reducing bandwidth consumption over the computer network; and receiving, at the computer server system, an indication of an occurrence of an interaction between an authoring person corresponding to the first of the authoring users and a candidate person corresponding to the first of the candidate users who was exposed by the first of the intermediary users to the information associated with the first of the published electronic data records;

the computer server system permitting and thereby causing an encrypted electronic transaction to occur only in response to receiving the indication of the occurrence of the interaction, wherein the encrypted electronic transaction occurs among the first of the authoring users and the first of the intermediary users by a third party system or using the computer server system as a proxy for the encrypted electronic transaction.

* * * * *